United States Patent [19]
Seyffert

[11] Patent Number: 5,641,070

[45] Date of Patent: Jun. 24, 1997

[54] SHALE SHAKER

[75] Inventor: Kenneth W. Seyffert, Houston, Tex.

[73] Assignee: Environmental Procedures, Inc., Houston, Tex.

[21] Appl. No.: 430,933

[22] Filed: Apr. 26, 1995

[51] Int. Cl.$^6$ ..................................................... B07B 1/32
[52] U.S. Cl. .................... 209/314; 209/332; 210/314; 210/324; 210/384; 210/389
[58] Field of Search ................................ 209/268, 269, 209/273, 314, 326, 332; 210/255, 314, 324, 384, 388, 389

[56] References Cited

U.S. PATENT DOCUMENTS

| | | | |
|---|---|---|---|
| 1,785,195 | 12/1930 | Hoes et al. | |
| 2,158,169 | 5/1939 | Wright | 210/255 X |
| 2,304,573 | 12/1942 | Kessler | 209/314 X |
| 2,511,239 | 6/1950 | Behnke et al. | 209/403 |
| 2,648,441 | 8/1953 | Soldan | 210/155 |
| 3,666,095 | 5/1972 | Krynock et al. | 209/254 |
| 3,666,277 | 5/1972 | Hubach et al. | 277/166 |
| 4,082,657 | 4/1978 | Gage | 209/311 |
| 4,420,391 | 12/1983 | Sharki | 209/403 |
| 4,457,839 | 7/1984 | Bailey | 209/234 |
| 4,529,510 | 7/1985 | Johnson et al. | 209/403 |
| 4,634,535 | 1/1987 | Lott | 210/780 |
| 5,076,921 | 12/1991 | Bailey et al. | 209/269 X |
| 5,265,730 | 11/1993 | Norris et al. | 209/326 |
| 5,385,669 | 1/1995 | Leone | 210/488 |
| 5,392,925 | 2/1995 | Seyffert | 209/405 |

FOREIGN PATENT DOCUMENTS 957193  5/1964  United Kingdom .

OTHER PUBLICATIONS

"Sweco Oilfield Services," Composite Catalog, 1993.
"LM–3 Full–Flo shale Shaker," Sweco Oilfield Services, 1993.
"Fluid Processing Equipment for the Drilling and Environmental Industries," Tri–Flo Int'l Inc., 1993.
"Pressure Control, Solids Control, Rig Instrumentation," Swaco Geolograph, 1993.
"Brandt Linear Separators," The Brandt Co., 1993.
"Petroleum, Mining, Environmental & Industrial," Fluid Systems Inc., 1993.
"Linear Motion Shale Shaker VSM 100," Thule Div. of Rig Technology Ltd., 1993.

*Primary Examiner*—F. J. Bartuska
*Attorney, Agent, or Firm*—Guy McClung

[57] ABSTRACT

A shale shaker has been developed which, in one aspect, has one or more upper screens and one or more lower screens with an upper screen at a discharge end of the shale shaker and a lower screen disposed to receive material discharged from a discharge end of one of the upper screens. In one aspect a portion of a lower screen underlies the discharge end of the upper screen. In another aspect a solid flowback pan prevents material falling through the upper screen(s) from falling onto the lower screen(s); and, in another aspect, the pan prevents material on a top of the lower screen(s) from falling into a bottom sump of the shale shaker which receives material which has fallen through the screen(s).

15 Claims, 2 Drawing Sheets

SHALE SHAKER

BACKGROUND OF THE INVENTION

1. Field of the Invention

The present invention is directed to shale shakers with vibrating screens, and, in one aspect, to shale shakers with tiered screens.

2. Description of Related Art

The prior art discloses a wide variety of vibrating screens, devices which use them, shale shakers, and screens for shale shakers. In shale shakers which use a plurality of screens, problems arise when an initial screen encounters such a large amount of fluid, e.g. drilling mud, that adequate and efficient screening is not possible.

The need for solids control in drilling mud in hydrocarbon well drilling is well known in the prior art. Drilling mud, typically a mixture of clay and water and various additives, is pumped through a hollow drill string (pipe, drill collar, bit, etc.) down into a well and exits through holes in a drillbit. The mud picks up cuttings (rock bits) and other solids from the well and carries them upwardly away from the bit and out of the well in a space between the well walls and the drill string. At the top of the well, the solids-laden mud is introduced to a shale shaker, a device which typically has a series of screens arranged in tiered or flat disposition with respect to each other. The screens catch and remove solids from the mud as the mud passes through them. If drilled solids are not removed from the mud used during the drilling operation, recirculation of the drilled solids can create viscosity and gel problems in the mud, as well as increasing wear in mud pumps and other mechanical equipment used for drilling. In some shale shakers a fine screen cloth is used with the vibrating screen. The screen may have two or more overlying layers of screen cloth. The frame of the vibrating screen is suspended or mounted upon a support and is caused to vibrate by a vibrating mechanism, e.g. an unbalanced weight on a rotating shaft connected to the frame. Each screen may be vibrated by vibratory equipment to create a flow of trapped solids toward an end of the screen on a top surface of the screen for removal and disposal of solids. The fineness or coarseness of the mesh of a screen may vary depending upon mud flow rate and the size of the solids to be removed.

In certain prior art shale shakers with one (or more) processing screens, a relatively small additional modular secondary screen is disposed at an end screen's discharge to provide for additional drying of solids to be discharged from the shaker. Such additional screens cannot adequately deal with a surge in fluid flow, e.g. during a "bottoms up" or riser pipe circulation condition. Also, such additional screens require inventorying of different screens. In other prior art systems, the discharge of one or more shale shakers is fed to another shale shaker for further de-liquefying and de-oiling. Such a process necessarily requires at least two shale shakers.

SUMMARY OF THE PRESENT INVENTION

The present invention, in one embodiment includes a shale shaker with a frame; a "basket" or screen mounting apparatus; one or more processing screens mounted at a first level in the basket; basket vibrating apparatus; and one or more processing screens at a second level mounted below those on the first level with one of the screens at the second level positioned to receive the discharge from an end of the screen(s) at the first level. In certain embodiments the screen at the second lower level that receives the first upper level discharge is a full size standard processing screen capable of handling excess liquid flowing from the screen(s) at the first level which the screen (s) at the first level cannot adequately process due to excessive volume. In one aspect a solid flowback pan is disposed above all or a portion of the lower screen to prevent material falling through the upper screen (s) from falling onto the lower screen.

Such a system, in certain embodiments, permits standard size and type screens to be used on the lower level as the screen that receives the discharge from the upper level. Such incorporation of a lower level screen makes it possible to have the same amount of screening surface in a more compact shale shaker; i.e., instead of e.g. three screens on one level disposed end to end, part of a third screen underlies an upper screen thereby reducing overall shaker length. Furthermore, in certain embodiments of this invention, e.g., a typical standard size screen used at the lower level can process 100% more fluid than can the modular secondary screen used in certain prior art devices.

In one preferred embodiment of a system as previously described, the lower screen is a standard size screen mounted beneath an upper standard size screen so that about half of the lower screen projects beyond the upper screen to receive solids, fluid, and/or a combination thereof discharged from a discharge end of the upper screen(s) and about half of the lower screen is disposed below the upper screen so that excess fluid flowing off the upper screen flows backward and down on the lower screen to utilize its entire surface area.

The shakers, seals, screens, vibrating apparatus, etc. of the devices of U.S. Pat. Nos. 5,392,925 and 5,385,669; and of U.S. applications Ser. No. 08/282,983 filed Jul. 29, 1994 now U.S. Pat. No. 5,551,575 and U.S. Ser. No. 29/014,571 filed Oct. 25, 1993 now U.S. Pat. No. D 366,040 (all co-owned with the present invention) may be used with the present invention and these patents and applications are incorporated herein fully for all purposes. Any screen in any embodiment of this invention may be a typical "flat" screen or a so-called "three-dimensional" screen with raised screening portions thereon. In one aspect a lower screen is a three-dimensional screen having a "hill and valley" surface with the "hills" extending from one end of the screen to the other in the same general direction as the movement of solids along the top of the screen. In another aspect the "hills" are transverse to this direction of movement. In another aspect only a portion of the lower screen projecting from a discharge end of the shaker beyond the farthest limit of an upper screen is three-dimensional and the remainder of the lower screen, which underlies the upper screen, is "flat"; or in one aspect the projecting portion is flat and the underlying portion is three-dimensional.

It is, therefore, an object of at least certain preferred embodiments of the present invention to provide:

New, useful, unique, efficient, non-obvious shale shakers;

A shale shaker with a plurality of screens in which the screens are tiered with a lower screen positioned below an upper discharging screen to receive discharged material from the upper screen for further processing;

Such a shale shaker in which, in one aspect, a portion of the lower screen is beneath a portion of the upper screen; and Such a shale shaker in which a solid deflecting plate or solid flowback pan prevents material falling through the upper screen(s) from falling onto the lower screen; and in one aspect with a portion abutting the lower screen to prevent solids on top of the lower screen from falling in a bottom sump of the shaker.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this parent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

DESCRIPTION OF EMBODIMENTS PREFERRED AT THE TIME OF FILING FOR THIS PATENT

Figure 1:
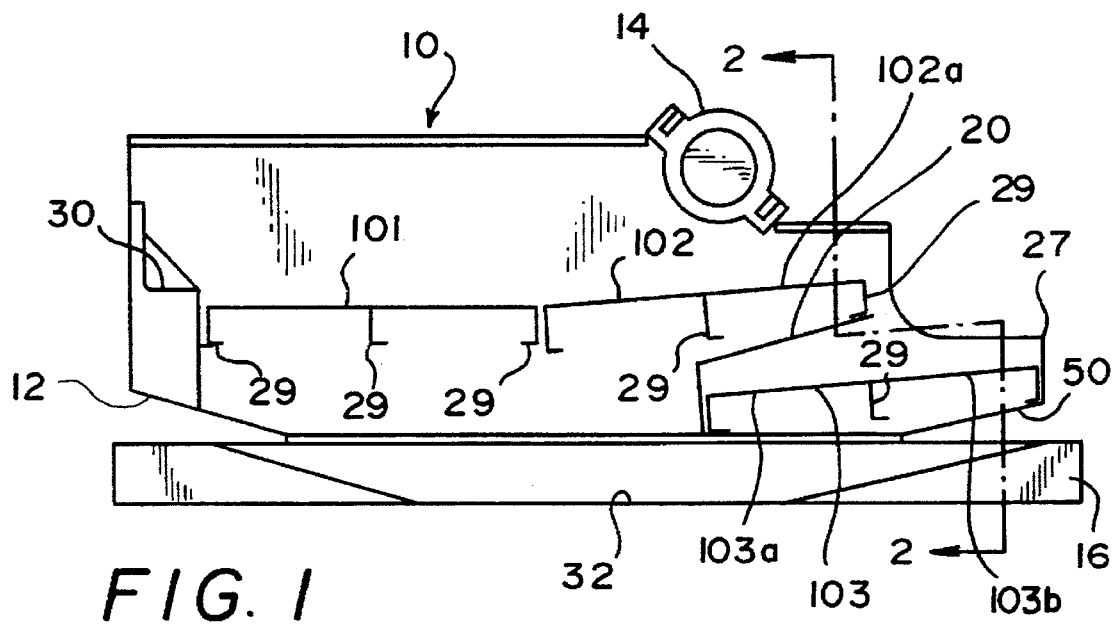
FIG. 1 is a side schematic view in cross-section of a shale shaker according to the present invention.

Referring now to FIGS. 1–5, a shale shaker 10 according to the present invention has two top screens 101, 102, and a bottom screen 103 (each covered with screening cloths or cloths as desired) on vibratable screen mounting apparatus or "basket" 12. The basket 12 may be mounted on rubber mounts or springs (see springs 13, FIGS. 4 and 5) which are supported on a frame 16. The basket 12 is vibrated by a motor and interconnected vibrating apparatus 14 which is mounted on the basket 12 for vibrating the basket and the screens. Pivoting apparatus 15 provides for adjusting basket inclination.

Figure 2:
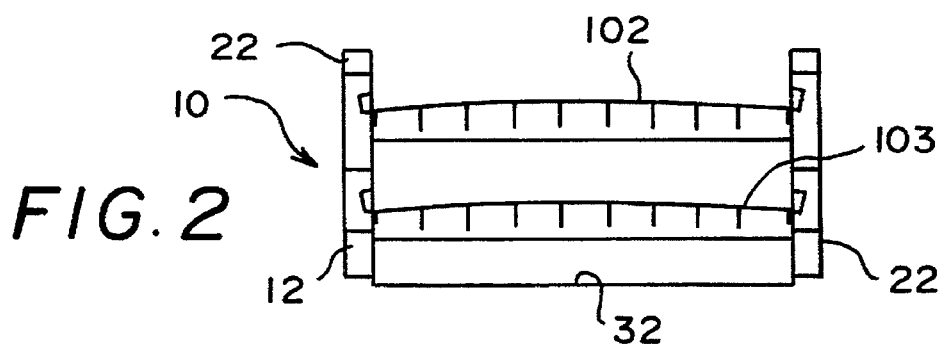
FIG. 2 is an end view in cross-section along line 2—2 of the shale shaker of FIG. 1.
Figure 3:
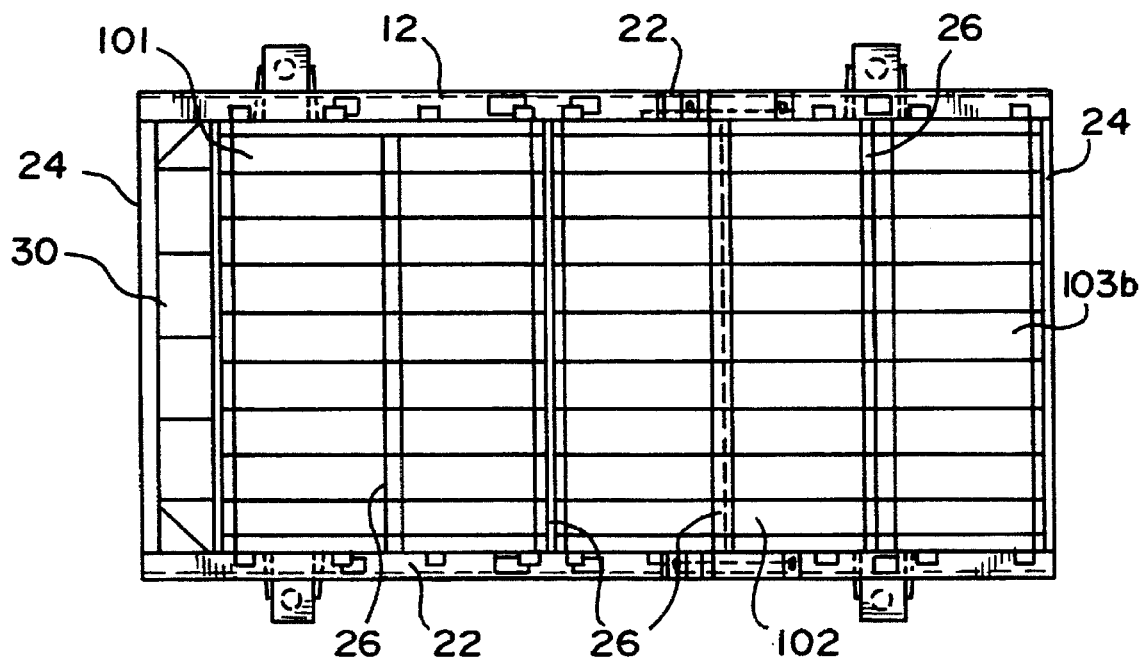
FIG. 3 is a top view of the shale shaker of FIG. 1.
Figure 4:
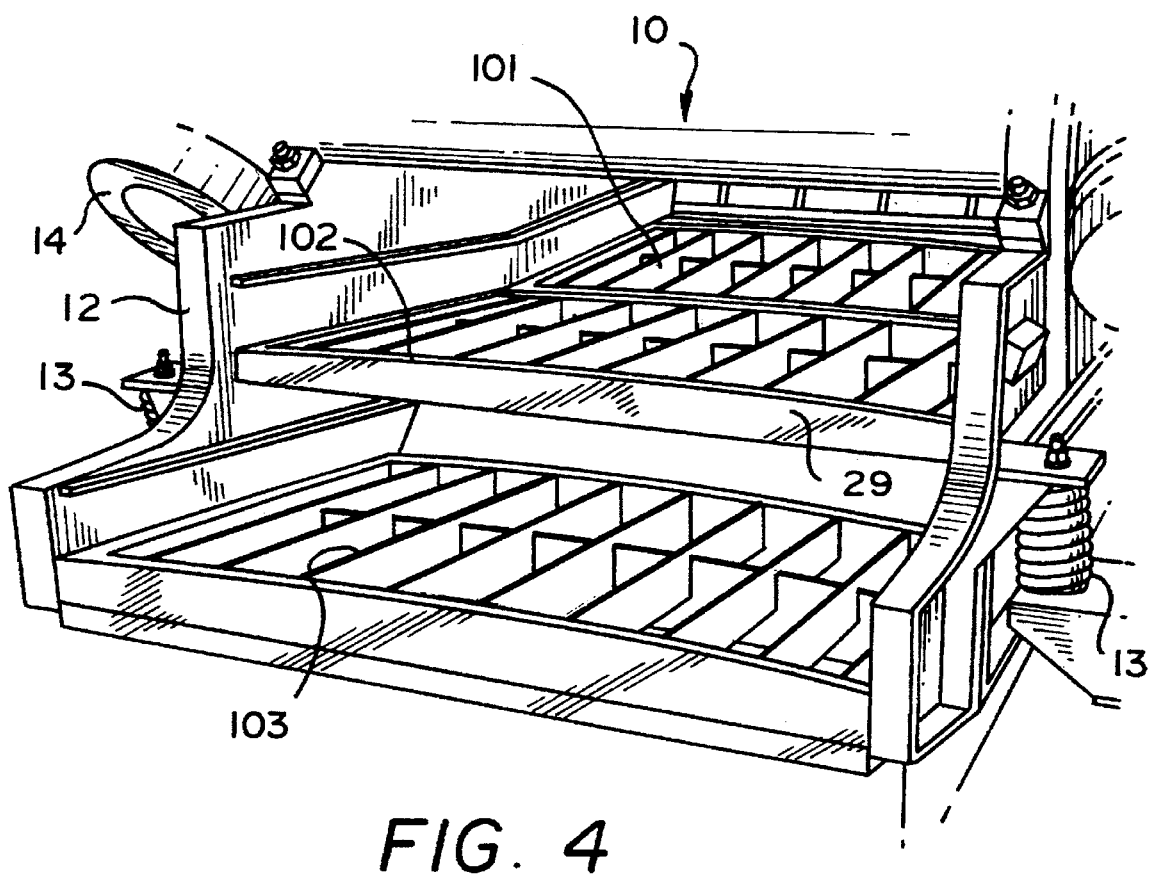
FIG. 4 is a perspective end view of the shaker of FIG. 1.
Figure 5:
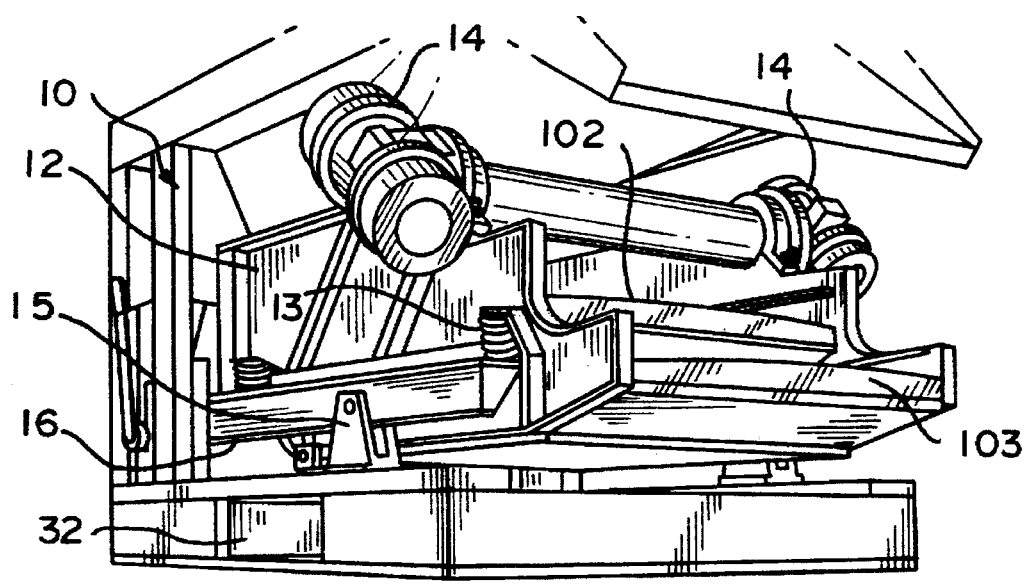
FIG. 5 is another perspective end view of the shaker of FIG. 1.

As shown in FIGS. 1 and 2, the three screens 101, 102, 103 are shown schematically without defined screen cloth openings. It is within the scope of this invention to use any mesh or cloth, or any combination thereof, on any screen, including but not limited to, a coarser mesh on upper screen(s) and a finer mesh on lower screens. Material to be shaken is introduced onto the first screen 101 from a deflector plate 30. The basket 12 includes side members 22, end members 24, and crossbars 26. A flowback pan 20 prevents material (e.g. liquid and solids) flowing through the screen 102 from flowing onto the lower screen 103 and directs such material down into a bottom sump 32 of the shaker 10. A portion of the pan 20 prevents solids on the lower screen 103 from falling into the sump 32. Each screen is held in opposed side mounting channels (not shown) secured to the sides 22 of the basket 12.

A portion 103a of the lower screen 103 underlies a portion 102a of the upper screen 102. In certain preferred embodiments more than 10% and no more than 60% of the lower screen underlies an upper screen; and in one embodiment about 50% of the lower screen underlies the upper screen. Material flowing through the portion of the lower screen 103 flows into the sump 32. A deflector plate 50 attached to a front discharge end 27 of the basket 12 provides a ramp down which material flowing through a front portion 103b of the lower screen 103 flows to the sump 32.

It is within the scope of this invention to eliminate the flowback pan 20. It is within the scope of this invention to use more than one lower screen, with or without a flowback pan; or to use a relatively large lower screen which underlies one or more than one upper screen or part thereof. In one embodiment the top screen(s) are three dimensional screen(s) and the lower screen is a "flat" screen; in another embodiment the lower screen is a three-dimensional screen and the upper screen(s) are "flat", or with multiple upper screen(s) only one (any one) of them is "flat" and the other screens are three-dimensional or only one of them is three-dimensional and the other screen(s) are "flat". Solids discharged off the discharge end (to the right in FIG. 1) are relatively drier compared to solids from a shaker that has no lower screen.

Any screen can be inclined at any angle or can be level (horizontal). As shown in FIG. 1, screens 102 and 103 are inclined at an angle of about five degrees and screen 101 is level. Inclining the whole basket five degrees in the same direction as the inclination of the inclined screens doubles their inclination and results in screen 101 being inclined about five degrees. In one embodiment the lower screen may be mounted and disposed to receive the discharge from a discharge end of the upper screen(s) with none or almost none of the lower screen underlying an upper screen, with or without a flowback pan. According to this invention screens are mounted in the shaker with well known mounting apparatus 29 and secured and sealed in place with well known securements and seals.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A shale shaker comprising a base, a basket for holding at least two shaker screens, the basket mounted movably with respect to and on the base, apparatus for vibrating the basket, said apparatus interconnected with the basket, and the at least two shaker screens releasably mounted on the basket and including at least one upper screen and at least one lower screen, the at least one lower screen mounted at a level below a level of the at least one upper screen, the at least one upper screen having a discharge end, the at least one lower screen disposed to receive material discharged from the discharge end of the at least one upper screen, the at least one lower screen having a first portion that underlies the at least one upper screen and a second portion that projects beyond the discharge end of the at least one upper screen, a single bottom sump below the basket for receiving all material falling through both screens, and a flowback pan disposed between the at least one upper screen and the at least one lower screen, the flowback pan overlying the first portion of the at least one lower screen for preventing material falling through the at least one upper screen from contacting the at least one lower screen and for directing said material into the single bottom sump, a portion of material passing through the at least one upper screen flowing directly to the single bottom sump without contacting the flowback pan.

2. The shale shaker of claim 1 further comprising the flowback pan disposed for preventing material on a top of the first portion of the at least one lower screen from falling into the single bottom sump.

3. The shale shaker of claim 1 further comprising a deflector plate attached to the basket down which material flowing through the second portion of the at least one upper screen flows to the single bottom sump.

4. The shale shaker of claim 1 further comprising the at least one upper screen comprising a plurality of at least two screens disposed end-to-end.

5. The shale shaker of claim 4 wherein at least one of the plurality of at least two screens is at an inclined angle with respect to horizontal.

6. The shale shaker of claim 1 further comprising the at least one lower screen comprising a plurality of at least two screens disposed end-to-end.

7. The shale shaker of claim 1 wherein the at least one upper screen has a different screening material than a screening material on the at least one lower screen.

8. The shale shaker of claim 7 wherein the at least one upper screen has a screening material of a first mesh size and the at least one lower screen has a screening material with a mesh size finer than that of the screening material of the at least one upper screen.

9. The shale shaker of claim 1 wherein the screens are standard commercially available screens.

10. The shale shaker of claim 9 wherein all the screens are the same size.

11. The shale shaker of claim 1 wherein the at least one upper screen is a three-dimensional screen.

12. The shale shaker of claim 1 wherein the at least one lower screen is a three-dimensional screen.

13. The shale shaker of claim 1 wherein a portion of the at least one upper screen is a three-dimensional screen.

14. The shale shaker of claim 1 wherein a portion of the at least one lower screen is a three-dimensional screen.

15. A shale shaker comprising a base, a basket for holding at least two shaker screens, the basket mounted movably with respect to and on the base, apparatus for vibrating the basket, said apparatus interconnected with the basket, the at least two shaker screens releasably mounted on the basket and including at least one upper screen and at least one lower screen, the at least one lower screen mounted at a level below a level of the at least one upper screen, the at least one upper screen having a discharge end, the at least one lower screen disposed to receive material discharged from the discharge end of the at least one upper screen, the at least one lower screen having a first portion that underlies the at least one upper screen and a second portion that projects beyond the discharge end of the at least one upper screen, a single bottom sump below the basket for receiving all material falling through both screens, a flowback pan disposed between the at least one upper screen and the at least one lower screen, the flowback pan overlying the first portion of the at least one lower screen for preventing material falling through the at least one upper screen from contacting the at least one lower screen and for directing said material into the single bottom sump, a portion of material passing through the at least one upper screen flowing directly to the single bottom sump without contacting the flowback pan, the flowback pan disposed for preventing material on a top of the at least one lower screen from falling into the single bottom sump, and a deflector plate attached to the basket down which material flowing through the second portion of the at least one upper screen flows to the single bottom sump.

* * * * *